May 16, 1950     D. W. KAUFMANN     2,508,170
METHOD AND APPARATUS FOR AUTOMATIC STRENGTH
REGULATION AND FILTRATION OF BRINES
Filed Jan. 12, 1949     3 Sheets—Sheet 1

INVENTOR
Dale W. Kaufmann
BY
Bean, Brooks, Buckley & Bean
ATTORNEYS

May 16, 1950 D. W. KAUFMANN 2,508,170
METHOD AND APPARATUS FOR AUTOMATIC STRENGTH
REGULATION AND FILTRATION OF BRINES
Filed Jan. 12, 1949 3 Sheets-Sheet 3

INVENTOR
Dale W. Kaufmann
BY
Bean, Brooks, Buckley & Bean.
ATTORNEYS

Patented May 16, 1950

2,508,170

UNITED STATES PATENT OFFICE 2,508,170

METHOD AND APPARATUS FOR AUTOMATIC STRENGTH REGULATION AND FILTRATION OF BRINES

Dale W. Kaufmann, Buffalo, N. Y., assignor to International Salt Company, Inc., Scranton, Pa.

Application January 12, 1949, Serial No. 70,504

11 Claims. (Cl. 137—78)

This invention relates to a method and automatic apparatus for maintaining a process regressive brine at any certain desired strength, in spite of salt subtraction or water addition incidental to the process such as would otherwise undesirably dilute or weaken the brine. The invention also relates to a method and automatic apparatus for continuously filtering from a circulating brine any solids or undesirable foreign materials which may enter the brine in the course of its use. However, the invention is not necessarily restricted to filtration of process brines in conjunction with strength regulation of process brines, inasmuch as either of the above stated objects may be accomplished alone, if and when desired.

Various industries employ circulating brines which should preferably be maintained substantially at prescribed strengths, such as for example in connection with spray decks and unit coolers in meat packing plants, gravity separators in canneries, and the like. These process brines tend continuously to become weakened due to absorption of water from the air or from the product being treated, or by subtraction of salt from the solution; and in order to maintain a prescribed brine strength, either dry salt or a stronger fortifying brine must be added to the process brine. To avoid undesirable fluctuations in the process brine strength, the dry salt or the fortifying brine must be added coincidently with and at a rate exactly equal to that of the brine dilution. In addition to becoming weakened, circulating process brines often pick up foreign materials such as rust scale, particles of the substances being processed, sawdust, strings, lint, and other filterable substances.

A principal object of this invention is the provision of an improved method and apparatus for automatically maintaining a circulating process brine at any prescribed strength, regardless of the extent to which and the rate at which the brine absorbs water or loses salt.

Another object of the invention is the provision of an improved apparatus whereby any foreign solids in the process brine or in the brine fortifying salt are filtered out, whereby a brine which is substantially colorless or decreased in color content and free from solids is delivered for fortifying the process brine; and whereby continuous by-passing of a portion or all of the process brine through the apparatus of the invention operates to remove foreign solids from the total volume of process brine.

Another object of the invention is the provision of an improved apparatus for dissolving dry salt to make substantially saturated fortifying brine, using unsaturated process brine as the salt solvent.

Other objects and advantages of the invention will appear from the specification hereinafter.

This invention is particularly applicable for use for example in conjunction with the known Lixate process for making saturated brine from rock salt, the salt dissolving apparatus for which is illustrated and described in simple form in United States Patent No. 1,928,008 to Thomas Forster Courthope. However, this invention is not necessarily restricted to use with the Courthope apparatus.

To these and other ends, this invention consists in the construction and arrangement of parts that will appear from the following description when read in conjunction with the accompanying drawings, the novel features being pointed out in the claims at the end of the specification.

The present invention contemplates an automatic brine strength control apparatus which in one form may provide for a column of fortifying brine of definite height which is of relatively high strength and specific gravity to be arranged in hydraulically balanced relation with a column of process brine which is of a greater height and relatively lower strength and specific gravity. When the two aforesaid columns of brine are properly connected and are in hydraulic balance there is no flow of fortifying brine into the process brine. However, if and as the process brine weakens, an unbalance results, and brine from the column of fortifying brine, if the latter is maintained at its prescribed height by supply from an outside source of fortifying brine, will automatically start to flow into the weakened process brine until the increasing specific gravity of the latter restores the hydraulic balance. The flow of fortifying brine into the process brine then ceases automatically. It is to be understood that whereas the apparatus of the invention may conveniently employ a fully saturated salt solution as the fortifying brine, the invention is not so limited and the fortifying brine may be of any specific gravity greater than that of the process brine. Also, the invention contemplates that the apparatus may employ a supply of fortifying brine which is maintained under definite pressure at the interface between the fortifying brine and the process brine, by any suitable means in lieu of the means shown and described in detail herein, such as for example a mechanically pressured system controlled by a pressure regulating valve.

More specifically, the invention contemplates a novel apparatus providing a hydraulic connection between the two brines in such a way that the fortifying brine will not appreciably tend to flow into and mingle with the process brine at the juncture therebetween, except under conditions of hydraulic unbalance.

Figure 1:
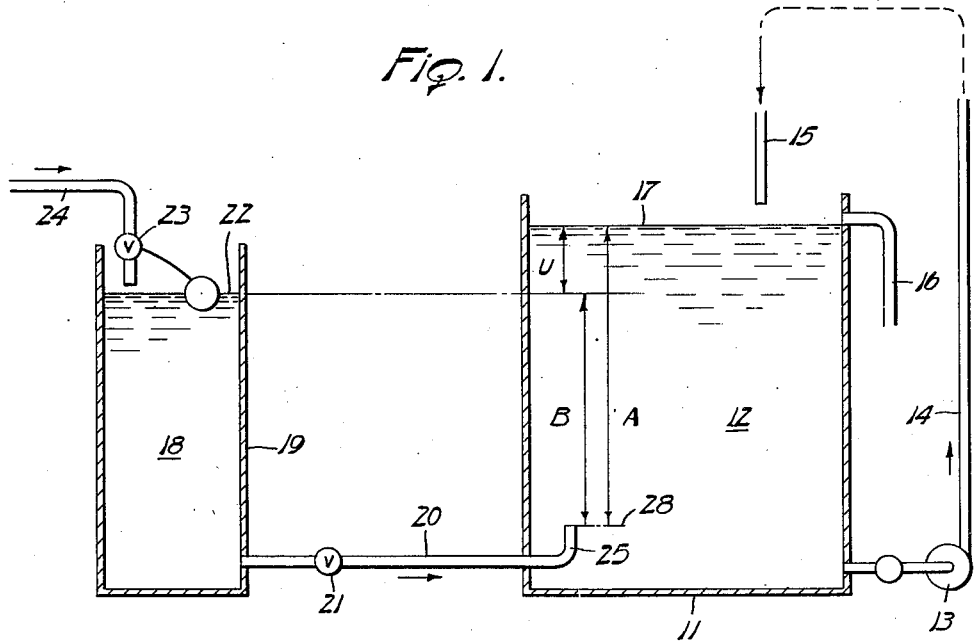
Fig. 1 is a diagrammatic view of a brine strength control apparatus constructed according to one possible embodiment of this invention.

The apparatus of Fig. 1 comprises a storage tank 11 which functions as a storage tank for the process brine 12. A pump 13 is shown as connecting the tank outlet to a pipe 14 for distribution of the brine to the brine-using process, from which it returns through a pipe 15 to the tank 11 in a weakened or diluted condition, such as may be due to water absorption during the process use. The absorbed water increases the brine volume, and therefore an arrangement is provided for discharge of the excess as through an overflow pipe 16, thus maintaining a constant liquid level in the tank 11 as indicated at 17.

A fortifying brine supply 18 is provided in a tank 19, and the process brine is automatically fortified and held at its prescribed strength by flow of relatively stronger brine 18 from the tank 19 through a pipe 20 into the tank 11. A valve 21 is provided in the pipe 20 and is left open during operation of the apparatus. The fortifying brine 18 need not necessarily be a saturated salt solution but should preferably be of constant strength, and must always be stronger and of higher specific gravity than the brine 12. The brine 18 is held at a constant level 22 in the tank 19 by means of a float valve 23 and replenished as needed from an outside source through a pipe 24; and it will be noted that the brine level 22 is lower than the brine level 17, and as illustrated in Fig. 1 the ratio of brine depth B to brine depth A for any desired strength of process brine 12 when using a specified fortifying brine 18 will be found by dividing the prescribed specific gravity of the process brine 12 by the known specific gravity of the fortifying brine 18.

The difference in vertical elevation between the fortifying brine level 22 and the process brine level 17 is determined by the relative specific gravities and hydraulic heads of the two brines 12—18. Thus, referring specifically to Fig. 1, the hydraulic column length A of process brine 12 may be arranged for any convenient tank depth, whereupon the brine column length B will be readily determined according to the desired strength of the process brine 12. For example, it may be wished to hold the process brine 12 constant at 1.139 specific gravity while using a fortifying brine 18 which is saturated at 1.204 specific gravity. In such case the brine level 12 must be located in such relation to brine level 17 that $A \times 1.139 = B \times 1.204$. If A for example is 10.00 feet, then B will be 9.46 feet. The elevation difference C will be then 10.00 feet minus 9.46 feet or .54 feet and the brine level 22 must therefore be located .54 feet below the brine level 17. The hydraulic heads in tanks 11 and 19 will then balance, and there will be no substantial flow through the pipe 20 and the two brines will not substantially mix provided the connection between the two brines is arranged to prevent such mixing, as will be explained hereinafter. However, whenever the brine 12 becomes lower than 1.139 in specific gravity, the stronger brine 18 will flow from tank 19 into tank 11 and into the weaker brine 12 until the latter again attains 1.139 specific gravity, whereupon transfer flow of brine 18 will cease.

A means of preventing appreciable spillage of the fortifying brine through the pipe 20, except in response to an unbalanced hydraulic head, is essential to the operation of the apparatus; because the stronger brine would otherwise bleed continuously into the weaker brine and displace the latter due to their different specific gravities. For example, as shown in Fig. 1, this may be accomplished by turning the pipe 20 upward at its discharge end portion 25, thereby creating between the two brines a horizontally disposed interface of small area whereby when the two brines are in hydraulic balance they tend to mingle only by a diffusion process which proceeds at such slow rate as not to matter in ordinary practice.

Figure 2:
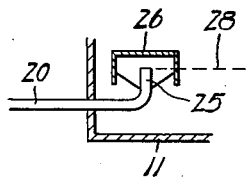
Figs. 2, 3, 4 are fragmentary illustrations of modified forms of hydraulic column connection devices such as are adapted for use in lieu of the connection device illustrated in conjunction with the apparatus of Fig. 1.
Figure 3:
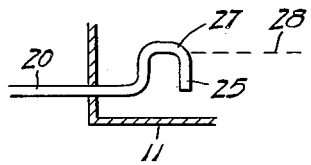
Figure 4:
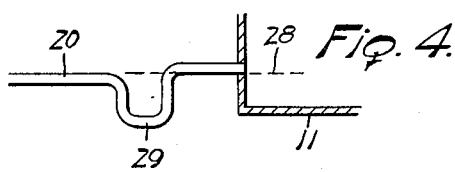

Inasmuch as the process brine 12 may be flowing into and out of tank 11, in the course of its use, at rates such as may cause considerable agitation and fluid turbulence in the region of the discharge pipe end 25, it may be advisable to protect the brine interface at the pipe end 25 by a suitable hood or cap 26 as shown in Fig. 2. Such a hood will protect the brine interface from agitation such as might unduly accelerate the normally slow and unimportant rate of diffusion of the strong brine into the weaker brine. Another means for protecting the brine interface against agitation is shown in Fig. 3, wherein the discharge end of the pipe 20 is formed with an inverted trap 27; the pipe discharge end 25 being thereby pointed downwardly. The small portion of strong brine in the right-hand leg and upper horizontal portion of the trap 27 will diffuse downwardly in response to the forces of gravity into the brine 12; but the strong brine in the left-hand leg of the trap will remain substantially at level 28 and will not flow appreciably into the brine 12 except under unbalanced hydraulic head conditions. Still another arrangement for protecting the brine interface against agitation is shown in Fig. 4 wherein a trap 29 is inserted in the pipe 20 outside of the tank 11 and arranged in such a way that the small portion of strong brine 18 in the horizontal pipe between the trap 19 and the tank 11 can diffuse out into the brine 12, but no further appreciable flow of strong brine 18 from the trap 29 into the pipe between the trap and the tank 11 will take place except under unbalanced hydraulic head conditions.

The apparatus of Fig. 1 requires a source of fortifying brine 18 to be obtained from an outside source and supplied to the tank 19 through the pipe 24. The fortifying brine may be made by dissolving salt in water, but the dissolution water required to provide the brine 18, if made thus, eventually displaces an approximately equivalent volume of brine 12 in the tank 11. This displaced volume of brine 12 overflows through the pipe 16 and causes a large loss and waste of salt in addition to the inevitable overflow loss resulting from process brine volume increase due to water absorption in the course of process usage of the brine. Therefore, to eliminate such extra loss of salt through dissolution in water, the supply salt should be dissolved in the unsaturated process brine 12 which may be taken either from pipe 14, pipe 15, or any other conveniently disposed portion of the brine circulating system.

Figure 5:
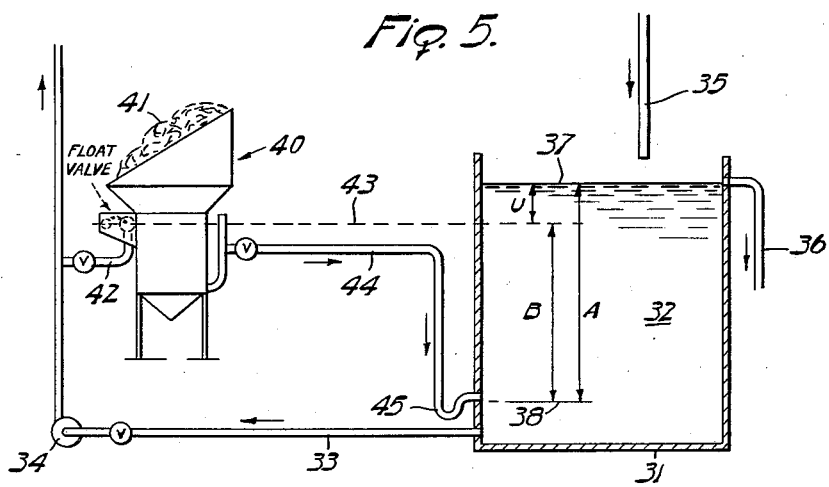
Fig. 5 is a view corresponding to Fig. 1, but of an apparatus including a dry salt dissolving device for providing the fortifying brine.

For example, an apparatus embodying the known Lixate process for making saturated brine from rock salt, is particularly adapted to permit use of the process brine 12 for salt dissolution, and is furthermore advantageous because it also continuously filters foreign solid materials from the solvent brine. Fig. 5 shows an apparatus for strength regulation of brines using the principle of hydraulic balance as heretofore described in conjunction with means providing for the dissolution of the fortifying salt by the process brine 32 as the solvent, and further embodying filtration of the process brine. The apparatus includes a tank 31 receiving the process brine 32 and having a brine delivery conduit 33 and pump 34 and brine return conduit 35. The overflow is indicated at 36, the top brine level at 37, and the brine interface level at 38. A salt dissolving apparatus 40, embodying the Lixate process as illustrated and described in United States Patent No. 1,928,003 is shown in Fig. 5 as receiving a supply of dry salt 41. To dissolve the salt a portion of the process brine 32 is taken from the pipe 33 and led to the dissolver 40 through a pipe 42; flow through which is controlled automatically by a float-operated valve as explained in the patent. The dissolver 40 produces fully saturated and clear brine which is filtered free from all solids such as occasionally enter the process brine or occur in the salt 41. The dissolver 40 is fully automatic in its operation and inasmuch as the solvent brine is held at a constant level 43 by operation of the dissolver float controlled valve, the salt 41 feeds in to the dissolver at the same rate dissolution takes place. Also, solvent brine from the pipe 33 enters the dissolver when, and only at the same rate as saturated brine is withdrawn from the dissolver through a pipe 44. This saturated fortifying brine flows from the dissolver 40 through the pipe 44 and into the process brine 32 of tank 31 when and as it is required for automatic hydraulic balance with the brine 32. A trap 45 is inserted in the pipe 44 to protect the interface between the brines as explained hereinabove.

In Fig. 5, the dissolver 40 is placed at such an elevation that the brine levels 43 and 37 occupy approximately the same vertical relationship as do the corresponding levels 22 and 17 in Fig. 1. In such case the vertical portion of pipe 44 between levels 43 and 38 acts as a standpipe for substantially saturated brine, thus taking the place of tank 19 in Fig. 1, but providing the same hydraulic head B of substantially saturated brine to balance against the hydraulic head A of process brine. Therefore, if and as the process brine in tank 31 weakens, an unbalance results, and filtered saturated brine flows into the process brine tank through the pipe 44 until the increasing specific gravity of the brine 32 restores the hydraulic balance, whereupon transfer of brine ceases. Due to the automatic operation of the dissolver 40 the dissolution brine enters the dissolver through pipe 42 at the same rate that saturated brine is withdrawn through the pipe 44, thereby holding the liquid level 43 constant at all times.

Figure 6:
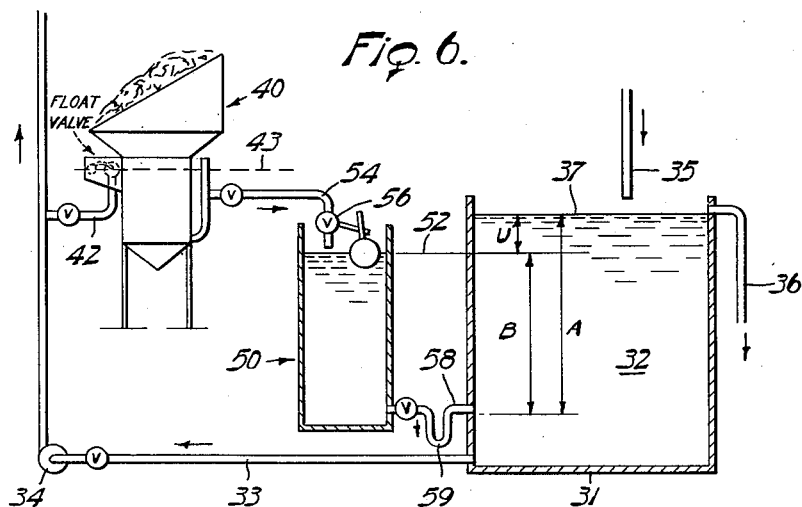
Figs. 6–7 are views of similar apparatus including means for regulating the strength of the process brine at will.

Whereas, the apparatus arrangements of Figs. 1 and 5 embody relatively fixed liquid levels for specific strengths of brines, if the strength of either brine, particularly the process brine is to be changed then a change must be made in the relative elevations of the top liquid levels in the two tanks. It may not be convenient or feasible to accomplish this by raising or lowering one of the tanks or the dissolver, in which case the change in the relative elevations of the two liquid levels may be accomplished by other means. For example, as shown in Fig. 6, the apparatus of Fig. 5 may be modified to include a standpipe 50. In such case the dissolver 40 is located with its liquid level 43 at a convenient substantial height above the desired liquid level 52 in the standpipe 50. Saturated brine from the dissolver 40 flows through a pipe 54 to the tank 50, only as and when brine is withdrawn from the latter, and is held constant therein at level 52 by an adjustable float controlled valve 56. The tank 50 is connected to the tank 31 by a pipe 58 in which is placed a trap 59 to protect the interface between the saturated brine and the process brine. The relationship of column lengths A, B and C to each other is determined as heretofore explained. If it is desired to make a change in the specific gravity of the process brine 32, the float device of the adjustable valve 56 is adjusted to cause the desired change in the level 52.

Figure 7:
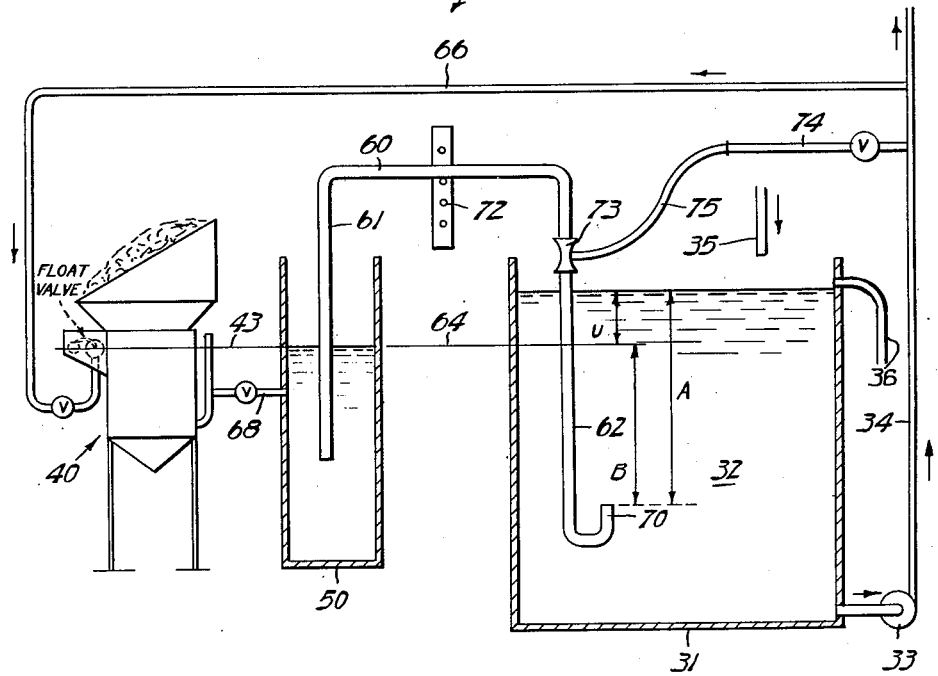

Another arrangement whereby the process brine 32 may be easily adjusted to different strengths, is shown in Fig. 7. This arrangement also avoids the necessity of a rigid pipe connection between the fortifying brine standpipe 50 and the process brine tank 31. In this case a siphon pipe 60 is arranged with its suction pipe leg 61 immersed in brine in the tank 50, and its discharge pipe leg 62 immersed in the brine 32 in tank 31. The brine in the tank 50 is replenished and held at a constant level 64, regardless of brine withdrawals therefrom, by the Lixate process using the dissolver 40, with its liquid level 43 placed at the same elevation as level 64 in the tank 50. As in the case of Fig. 6, the salt in the dissolver 40 is dissolved by a portion of the process brine 32, taken from the brine circulating pipe 34 by a pipe 66. Saturated brine from the dissolver 40, flows to the tank 50 through a pipe 68. If and as the liquid level 64 tends to drop due to brine withdrawal, an equivalent quantity of brine automatically enters through pipe 68 from the dissolver 40, to hold the brine level 64 at a constant elevation. However, the method of holding the level 64 constant is not necessarily restricted to use of the dissolver 40 because this may be accomplished, for example as shown in Fig. 1, as applied to control of the level 22 in tank 19. The discharge pipe leg 62 of the siphon 60 must be arranged to protect the interface between the fortifying brine and the process brine by having the discharge end of the pipe turned upwardly as shown at 70, for the reasons explained in connection with the discharge end 25 of the pipe 20 in Fig. 1. Or, if preferred, the interface may be protected by an arrangement as shown in either Fig. 2 or Fig. 3, or by some equivalent means.

In the apparatus of Fig. 7 the ratio of the hydraulic head B to the hydraulic head A is changed by raising or lowering the siphon pipe 60, thus holding the process brine 32 at any desired strength, depending upon the ratio selected. The siphon pipe 60 may be raised, lowered, and held at any desired elevation by various simple devices; for example as by suspending it from hooks 72 disposed at various heights. The siphon pipe 60 may be filled with fortifying brine by priming it by means of aspirator or ejector 73 inserted in the pipe 62. The aspirator 73 is operated by a portion of the process brine taken from the pipe 34 by means of a pipe 74 and a flexible hose 75. The aspirator 73 might, alternatively, be operated by water under pressure passing through the flexible hose 75.

Although only a few embodiments of the invention are shown and described herein, it will be understood that this application is intended to cover such changes or modifications as come within the spirit of the invention or the scope of the following claims.

I claim:

1. An apparatus for automatically maintaining hydraulic balance between a column of predetermined relatively high and constant strength brine and a column of relatively low strength brine and for causing automatic feeding of said predetermined high strength brine into said column of low strength brine for maintaining the brine in the latter column at uniform strength, said apparatus comprising container means for said columns of brine and liquid passage means interconnecting said container means adjacent the lower ends thereof, said passage means including an upwardly directed portion arranged in open communication with the low strength brine container portion to accommodate said different strength brines in opposed relation therein whereby to provide a horizontally disposed interface between said different strength brines, and means for maintaining the levels of the brines in the columns constant relative to each other and the level of said high strength brine below the level of said low strength brine.

2. An apparatus for automatically maintaining hydraulic balance between a column of predetermined high and constant strength brine and a column of low strength brine and for causing automatic feeding of brine from the high strength brine column to the low strength brine column for maintaining the brine strength in the low strength brine column at substantially uniform strength, said apparatus comprising means fluidly interconnecting said columns adjacent the lower ends thereof and having an upwardly directed portion in open communication with the low strength brine column at the position of the junction between said different strength brines when they are in hydraulic balance whereby to provide a horizontally disposed interface between said different strength brines at the position of junction therebetween, and means for maintaining the levels of the brines in said columns constant relative to each other, the level of the brine in the high strength column being intermediate the level of the brine in the low strength column and the level of said interface.

3. An apparatus for automatically maintaining a supply of regressive process brine at substantially uniform strength, comprising a container receiving said process brine at a constant head therein, a second container receiving a supply of fortifying brine therein at a constant head and strength, and a liquid passage system maintaining said two supplies of brine in hydraulic balance and for causing automatic feeding of brine from said fortifying brine container into said process brine container to maintain said process brine at uniform strength, said passage system comprising means fluidly interconnecting said containers adjacent the lower ends thereof, and including an upwardly directed portion in open communication with the low strength brine container and providing a horizontally disposed interface at the junction between said process and fortifying brines.

4. An apparatus for automatically feeding a relatively high predetermined constant strength brine into a relatively low strength brine for maintaining the latter at substantially uniform strength, said apparatus comprising separate container means for said brines, and means fluidly interconnecting said container means, said means including a hydraulic trap having an upwardly directed portion arranged to accommodate said different strength brines in opposed relation therein whereby to provide a horizontally disposed interface between said different strength brines with the high strength brine below the low strength brine therein, and means for maintaining the levels of the brines in said containers constant relative to each other and the level of said high strength brine below the level of said low strength brine.

5. An apparatus for automatically maintaining a supply of regressive process brine at substantially uniform strength, comprising a container receiving said process brine at a constant head therein, a second container carrying a supply of salt, means conducting a portion of the process brine into said second container to produce a supply of constant strength fortifying brine, a third container arranged to receive a supply of said fortifying brine therein at a constant head, and means fluidly interconnecting said first and third containers for maintaining said two supplies of brine in hydraulic balance and for causing automatic feeding of brine from said fortifying brine container into said process brine container to maintain said process brine at uniform strength, said fluid interconnecting means comprising means interconnecting said containers adjacent the lower ends thereof and including an upwardly directed portion providing a horizontally disposed interface at the junction between said process and fortifying brines, with the high strength brine below the low strength brine, and means for maintaining the levels of the brines in the containers constant relative to each other and the level of said high strength brine below the level of said low strength brine.

6. An apparatus for automatically maintaining a supply of regressive process brine at substantially uniform strength and in clean filtered condition, comprising a container receiving a circulating portion of said process brine at a constant level therein, a second container carrying a supply of granular salt, means circulating a portion of the process brine into said second container as required whereby to produce a supply of constant strength fortifying brine and at the same time to filter said process brine through said salt to absorb filterable material from said process brine and to produce a clean fortifying brine, a third container arranged to receive a supply of said fortifying brine therein at a constant level, and means fluidly interconnecting said first and third containers for causing automatic feeding of brine from said fortifying brine container into said process brine container to maintain said process brine at uniform strength, said fluid interconnecting means comprising means interconnecting said containers adjacent the lower ends thereof and including an upwardly directed portion providing a horizontally disposed interface at the junction between said process and fortifying brines, with the high strength brine below the low strength brine therein, and means maintaining the levels of the brine in said containers constant relative to each other and the level of said high strength brine below the level of said low strength brine.

7. An apparatus for automatically maintaining a supply of regressive process brine uniformly at adjustable strength, comprising a first container receiving said process brine, means maintaining the process brine in said container at a constant head, a second container receiving a supply of constant strength fortifying brine therein at a predescribed constant head, a liquid passage system maintaining said two supplies of brine in hydraulic balance and for causing automatic feeding of brine from said fortifying brine container into said process brine container to maintain said process brine at uniform strength, said passage system comprising means fluidly interconnecting said containers and including an upwardly directed portion in open communication with the low strength brine container providing a horizontally disposed interface at the junction between said process and fortifying brines, and means for regulating the prescribed constant head of said fortifying brine within said second container to thereby cause regulation of the strength of said process brine.

8. An apparatus for automatically maintaining a supply of regressive process brine at desired strength, comprising a container receiving said process brine at a constant head therein, a second container carrying a supply of salt, means conducting a solvent into said second container to produce a supply of constant strength fortifying brine, a third container arranged to receive a supply of said fortifying brine therein at a specified constant head, means fluidly interconnecting said first and third containers for maintaining said two supplies of brine in hydraulic balance and for causing automatic feeding of brine from said fortifying brine container into said process brine container to maintain said process brine at uniform strength, said fluid interconnecting means comprising means interconnecting said containers and including an upwardly directed portion providing a horizontally disposed interface at the junction between said process and fortifying brines with the high strength brine below the low strength brine therein, and control means for adjustably regulating the head of said fortifying brine in said third container to cause regulation of the strength of said process brine.

9. An apparatus for automatically maintaining a supply of regressive process brine at desired strength and in clean filtered condition, comprising a container receiving a circulating portion of said process brine at a constant level therein, a second container carrying a supply of granulated salt, means circulating a portion of the process brine into said second container as required whereby to produce a supply of constant strength fortifying brine and at the same time to filter said process brine through said granular salt to absorb filterable material from said process brine and to produce a clean fortifying brine, a third container arranged to receive a supply of said fortifying brine therein at a constant level, and means for maintaining the levels of the brines in said containers constant relative to each other and the level of said high strength brine below the level of said low strength brine, and a siphon conduit interconnecting the brines within said first and third containers for maintaining said two supplies of brine in hydraulic balance and for causing automatic feeding of brine from said fortifying brine container into said process brine container to maintain said process brine uniformly at desired strength, said conduit system comprising conduit means bodily adjustable to different elevations for controlling the strength to which the process brine is maintained, and said conduit including an upwardly directed portion disposed in said low strength brine container providing a horizontally disposed interference at the junction between said process and fortifying brines.

10. An apparatus for automatically maintaining a supply of regressive process brine at desired strength, comprising a first container receiving a portion of said process brine at a constant level therein, a second container arranged to receive a supply of high predetermined constant strength fortifying brine therein at a constant level below the level of brine in said first container, and a siphon conduit interconnecting the brines within said containers for maintaining said two supplies of brine in hydraulic balance and for causing automatic feeding of brine from said fortifying brine container into said process brine container to maintain said process brine at desired strength, said conduit including an upwardly directed portion disposed in said low strength brine container providing a horizontally disposed interface at the junction between said process and fortifying brines.

11. An apparatus for automatically maintaining a supply of regressive process brine at desired adjusted strength, comprising a first container receiving a portion of said process brine at a constant level therein, a second container arranged to receive a supply of high predetermined constant strength fortifying brine therein at a constant level below the level of brine in said first container, a siphon conduit interconnecting the brines within said containers for maintaining said two supplies of brine in hydraulic balance and for causing automatic feeding of brine from said fortifying brine container into said process brine container to maintain said process brine at desired strength, said conduit including an upwardly directed portion disposed in said low strength brine container providing a horizontally disposed interface at the junction between said process and fortifying brines, and said siphon conduit being bodily adjustable to different elevations for regulation of the strength at which said process brine is maintained, and means for priming said siphon conduit with fortifying brine.

DALE W. KAUFMANN.

No references cited.